INVENTORS.
Bohdan Carniol
Rudolf Styblo 3,518,551
Patented June 30, 1970

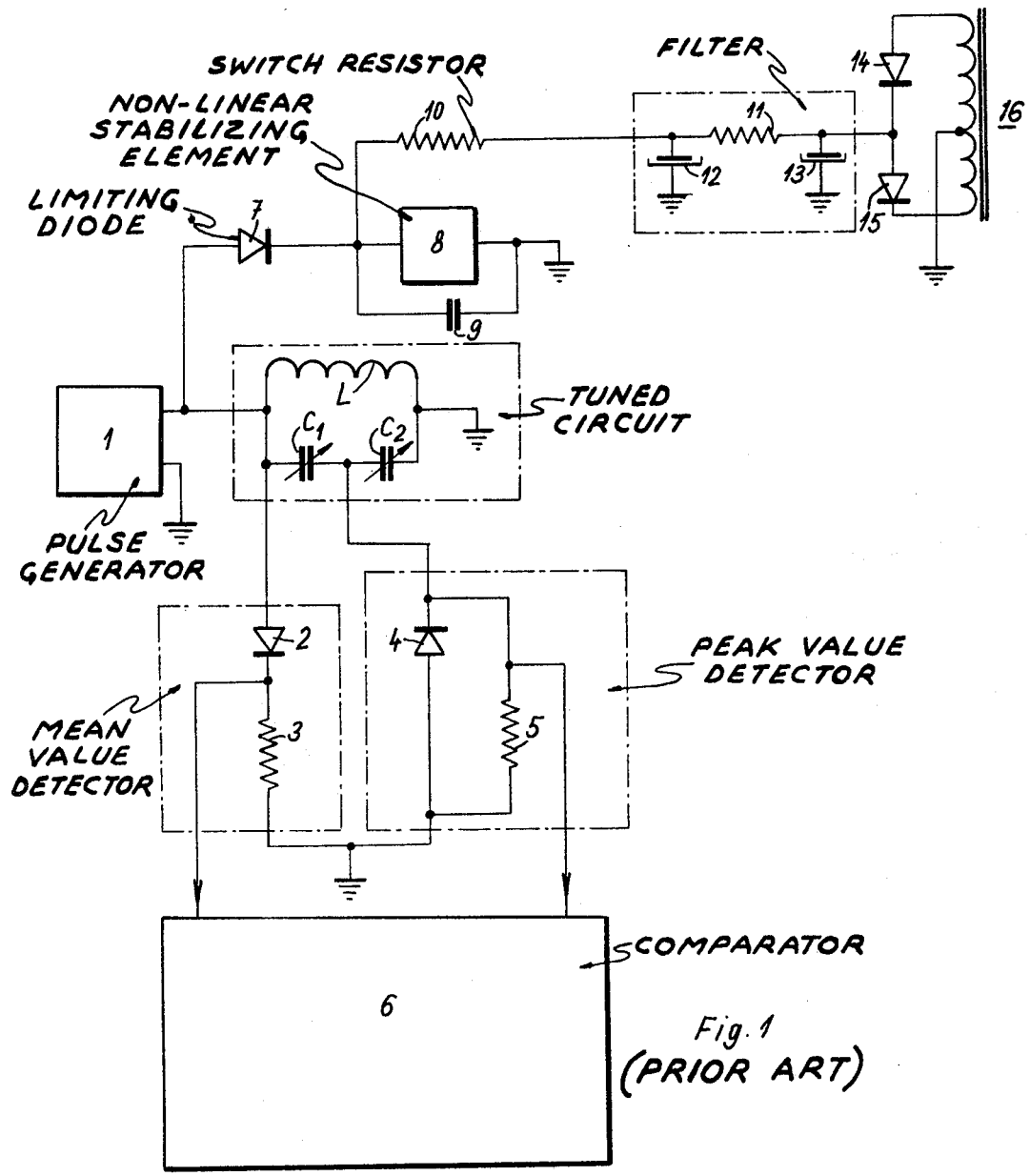

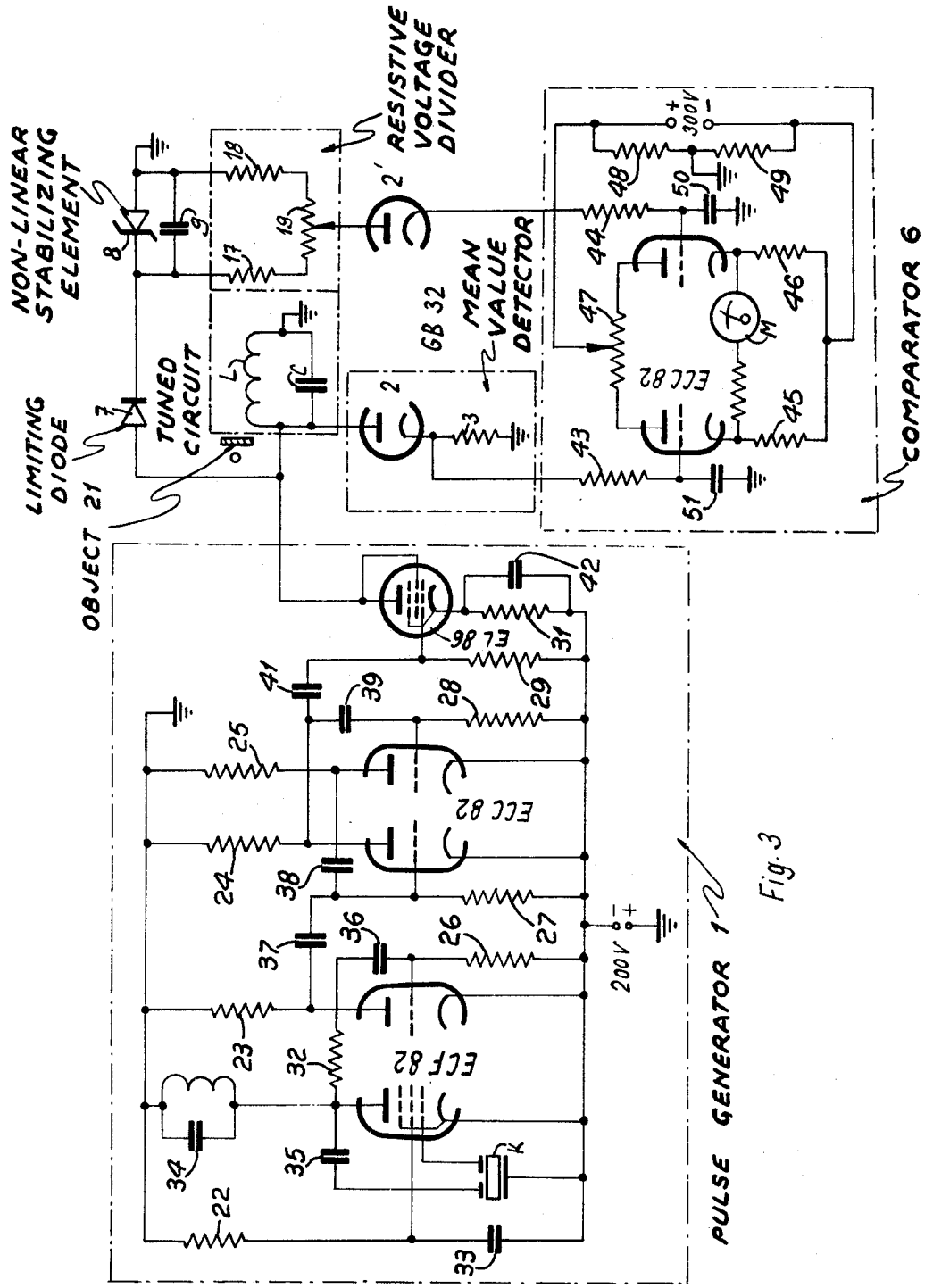

1

3,518,551
CIRCUIT ARRANGEMENT FOR MEASURING THE DAMPING OF AN OSCILLATION
Bohdan Carniol and Rudolf Stýblo, Prague, Czechoslovakia, assignors to Tesla narodni podnik, Prague, Czechoslovakia
Filed Feb. 8, 1968, Ser. No. 704,161
Claims priority, application Czechoslovakia, Feb. 16, 1967, 1,132/67
Int. Cl. G08b 13/26
U.S. Cl. 328—5    10 Claims

ABSTRACT OF THE DISCLOSURE

In a circuit for measuring the damping of an oscillation, a limiting diode connected to a source of free oscillations limits the peak of such oscillations to a determined magnitude. A non-linear stabilizing Zener diode connected to the limiting diode provides a cutoff voltage having the determined magnitude for blocking the limiting diode to limit the peak of the free oscillations to such magnitude. A mean value detector connected to the source of oscillations provides a voltage proportional to the mean value of the envelope of the oscillations. A resistive voltage divider connected to the Zener diode provides a voltage proportional to the peak value of the oscillations. A comparator connected to the mean value detector and to the resistive voltage divider compares the magnitudes of the voltages provided thereby.

BACKGROUND OF THE INVENTION

Field of the invention

The present invention relates to a circuit arrangement for measuring the damping of an oscillation. More particularly, the invention relates to a circuit arrangement for measuring the damping of an oscillation produced by an oscillator or for measuring the parameters of an object coupled to the oscillator, which object influences the damping of the oscillation. The circuit arrangement of the present invention determines the mean magnitude or value of the envelope of the free damped oscillation produced by the oscillator.

The oscillator may comprise any suitable circuit or apparatus for producing a free damped oscillation. A suitable oscillator may thus comprise, for example, a tuned LC or inductance capacitance circuit, a cavity resonator, an electromechanical resonator or a magnetomechanical resonator.

The object coupled to the oscillator, the parameters of which are to be measured, may be an electrical conductor or a dielectric and may be galvanically, inductively or capacitively coupled to a tuned LC circuit. The inductive coupling may be achieved by placing the object in operative proximity with the inductor L of the LC circuit. The capacitive coupling may be achieved by placing the object in the dielectric of the capacitor C of the LC circuit. When the oscillator is an electromechanical or magnetomechanical resonator, the object may be a surrounding solid, liquid or gas which is in electrical contact with the surface of such resonator and therefore influences the damping of oscillations produced by said resonator.

Description of the prior art

The damping of an oscillation produced by a tuned circuit may be measured by known circuit arrangements. In a known circuit arrangement, a first detector has a low time constant $\theta_{RC\ min}$ which is selected to be less than the time constant $\theta_{LC}$ of a tuned LC circuit which pro-

2 duces free oscillations. The first detector provides a DC voltage proportional to the mean value $V_{st}$ of the envelope of the free oscillations. A second detector has a high time constant $\theta_{RC\ max}$ which is selected to be greater than the time constant $\theta_{LC}$ of the tuned LC circuit. The second detector provides a DC voltage proportional to the peak value $V_{max}$ of the envelope of the free oscillations. The damping of the oscillations produced by the tuned LC circuit is determined by comparing the DC voltages of the first and second detectors. This circuit arrangement permits the measurement of the parameters of an object of the aforedescribed type coupled to the tuned circuit in the aforedescribed manner.

Instead of comparing the voltages proportional to the mean and peak values of the envelope of the free oscillations, a circuit arrangement may compare the mean values of free oscillations produced by two different and independent tuned circuits $L_1C_1$ and $L_2C_2$. The tuned LC circuits may be replaced by electromechanical or magnetomechanical resonators.

If the peak value $V_{max}$ of the envelope of the free oscillations is not constant, as it should be, ideally, the measurement of the mean value $V_{st}$ of said envelope, without the reference value dependent upon said peak value, cannot be of the maximum stability and sensitivity required. The peak value of the envelope of the free oscillations is most often stabilized by a limiting diode connected to the oscillator. The limiting diode is blocked, or switched to its non-conductive condition, by a cutoff voltage $E_z$. At the instant that the amplitude of the free oscillations exceeds the magnitude of the cutoff voltage $E_z$, the limiting diode is switched to its conductive condition. The limiting diode is switched to its non-conductive condition at the instant that the amplitude of the free oscillations falls below that of the cutoff voltage $E_z$. The conductive time of the limiting diode is called the limiting period.

If the internal resistance or impedance of the limiting diode in the permissible direction is sufficiently low, the maximum amplitude of the free oscillation is effectively limited when $V_{max}$ equals $E_z$. The succeeding waves of the free oscillation are not limited in amplitude, since their amplitudes are lower in accordance with an exponential function, so that the limiting diode remains in its non-conductive condition. The cycle is repeated for each new free oscillation produced. The cutoff voltage $E_z$ is a constant DC voltage and is usually provided by a non-linear stabilizing device such as, for example, a glow discharge lamp or a Zener diode, energized by a DC voltage of greater magnitude via a resistor.

If there is a sharp transition from a zone of high internal resistance to a zone of low internal resistance at the non-linear stabilizing device, a cutoff voltage $E_z$ is produced which is predominantly determined by the properties of said non-linear stabilizing device and is partially determined by the magnitude of the voltage which energizes said non-linear stabilizing device. It is not possible to attain the ideal condition, even when the described effective methods for limiting the peak value are utilized, since the appropriate reference magnitude or value utilized for limiting the peak value depends, for example, upon the temperature dependence of the non-linear stabilizing element, and so on. Under these conditions, the limit of stability and sensitivity of the measurement depends upon a suitable provision of the reference magnitude.

The mean value of the second reference tuned circuit may be utilized, but such utilization is too complex, complicated and expensive in most cases, since it requires an independent energizing stage for each of the two tuned circuits. A combination of effects has been utilized to overcome these difficulties. The effects include the limiting of the peak value of the free oscillations by the limiting diode and the derivation of the reference value from the peak detector. Furthermore, in order to compare the reference value and the mean value, it is necessary to utilize either a voltage divider for the DC output of the peak detector or a capacitive divider for the input of said peak detector. It is inconvenient to utilize a voltage divider for the DC output of the peak detector, since the peak detector and the mean value detector must be as similar as possible.

The diodes are selected with a resistance which is not too low in a permissible direction, so that they provide good detection even at high frequencies. With respect to the required high input impedance of the detector, the voltage divider must have a high ohmic resistance, in the order of megohms. This is attainable only by utilizing a mass resistor, as opposed to a wire resistor. The stability of a mass resistor or potentiometer is, however, not sufficient for such use. Furthermore, a voltage divider connected in this manner also divides the initial diode voltage of the peak detector when a vacuum tube diode is utilized. This disrupts compensation for the initial operation of the mean value and peak value detectors and decreases the stability of the measurements. It is therefore preferable to utilize a capacitive divider at the input to the peak detector. This, however, is not convenient, partly due to the necessity for eliminating the small variations of loss angle, since the described circuit arrangement functions to measure small variations or changes in damping of the free oscillations. Such damping occurs in the capacitive divider part of the circuit arrangement.

It is thus inconvenient to utilize the usual rotary capacitors having friction grounding contacts. It is more convenient to utilize larger and more expensive capacitors with split stators, thereby avoiding the disruptive friction grounding contacts. The usual switches cannot be utilized, since they cause instability of measurement due to a transition resistance which arises after a period of time. Special switches, however, with long term extremely low transition resistance, are expensive and of large dimensions. Furthermore, the capacitive divider causes instability of measurement due to its parasitic variations in the capacitive dividing due to the unequal temperature variations affecting both divider capacitors and the variations of temperature affecting the leads to the divider.

SUMMARY OF THE INVENTION

The principal object of the present ivention is to provide a new and improved circuit arrangement for measuring the damping of an oscillation.

An object of the present invention is to provide a circuit arrangement for measuring the damping of an oscillation, which circuit arrangement overcomes the disadvantages of the known circuit arrangements and is inexpensive and functions with efficiency, effectiveness and reliability.

An object of the present invention is to provide automatic generation of the DC cutoff voltage $E_z$ at the non-linear stabilizing element, which is preferably a Zener diode, by current pulses which flow through the limiting diode during the limiting periods, so that the reference voltage $E_{ref}$ thus produced equals the cutoff voltage and is compared with the signal at the output of the mean value detector.

In the circuit arrangement of the present invention, a capacitor and a stable resistance voltage divider are advantageously connected to the non-linear stabilizing element. With respect to the selection of the limiting diode having a low resistance in the permissible direction and with respect to blocking beyond the limiting period, the resistance voltage divider may be selected as a low resistance voltage divider.

Since the DC cutoff voltage is generated at the non-linear stabilizing element by current pulses during the limiting period, the circuit arrangement of the present invention eliminates the need for an independent source of DC voltage, as well as for a main transformer rectifier, large filter capacitors, large filter resistors and switch resistance. There is thus a considerable cost reduction, reduction of the dimensions of the circuit arrangement of the present invention and reduction of the required input power.

In the circuit arrangement of the present invention, the low resistance voltage divider is connected to the non-linear stabilizing element and may be in the order of tens of kilohms and may be a wire resistance divider. This eliminates the need for the complex, complicated and expensive capacitive divider and avoids the functional instability of such divider. The circuit arrangement of the present invention is thus substantially less expensive in manufacture and operates with a considerable increase in measurement stability. A capacitor is connected to the non-linear stabilizing element and effectively removes the remainder of the AC voltage component.

In accordance with the present invention, a circuit arrangement for measuring the damping of an oscillation comprises a source of free oscillations. A limiting diode connected to the source of free oscillations limits the peak of the free oscillations to a determined magnitude. A non-linear stabilizing element connected to the limiting diode provides a cutoff voltage having a magnitude equal to the determined magnitude for blocking the limiting diode to limit the peak of the free oscillations to the determined magnitude. A mean value detector connected to the source of free oscillations provides a voltage proportional to the mean value of the envelope of the free oscillations. A peak value circuit connected to the non-linear stabilizing element provides a voltage proportional to the peak value of the free oscillations. A comparator connected to the mean value detector and peak value circuit compares the magnitudes of the voltages provided by the mean value detector and the peak value circuit.

The peak value circuit comprises a resistive voltage divider connected across the non-linear stabilizing element which comprises a Zener diode. The non-linear stabilizing element is connected in series with the limiting diode and the peak value circuit comprises a resistive voltage divider having one end connected to one end of the stabilizing element and another end connected to the other end of the stabilizing element at a common point in the connection between the stabilizing element and the limiting diode. A capacitor may be connected across the non-linear stabilizing element. The resistive voltage divider comprises a potentiometer having a slidable contact, the comparator being connected to the slidable contact.

BRIEF DESCRIPTION OF THE DRAWINGS

In order that the present invention may be readily carried into effect, it will now be described with reference to the accompanying drawings, wherein:

FIG. 1 is a part circuit and part block diagram of a known embodiment of a circuit arrangement for measuring the damping of an oscillation;

FIG. 3 is a circuit diagram of a modification of the embodiment of FIG. 2.

DESCRIPTION OF THE PREFERRED EMBODIMENTS

Figure 2:
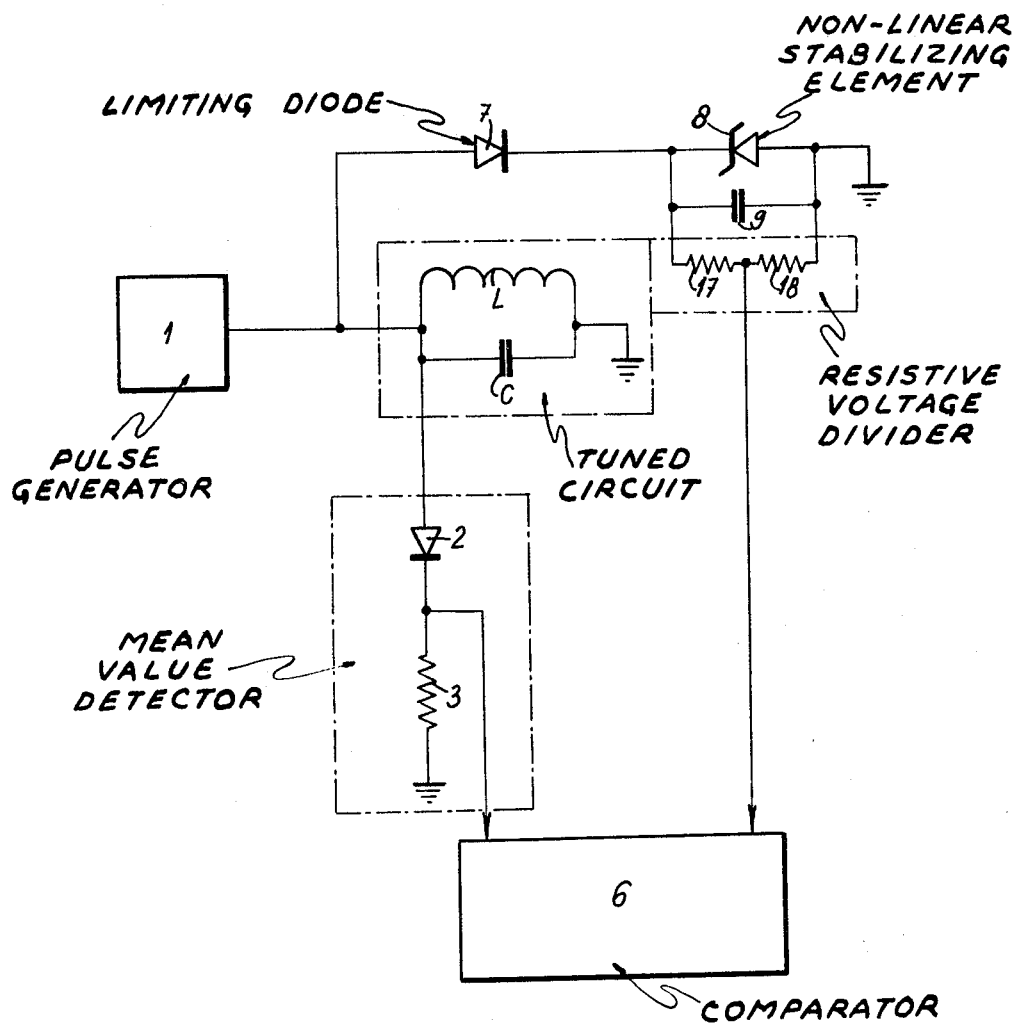
FIG. 2 is a part circuit and part block diagram of an embodiment of the circuit arrangement of the present invention.

In the figures, the same components are identified by the same reference numerals.

In FIG. 1, a pulse generator 1 supplies pulses to an oscillator which comprises a tuned circuit having an inductor L and a capacitive divider $C_1C_2$ connected in a closed loop. A mean value detector connected to the tuned circuit $LC_1C_2$ comprises a diode 2 and a resistor 3 connected in series with said diode and functions to detect the mean value of the envelope of free oscillations produced by said tuned circuit. A peak value detector connected to the tuned circuit $LC_1C_2$ comprises a diode 4 and a resistor 5 connected in parallel with said diode and functions to detect the peak value of the envelope of free oscillations produced by said tuned circuit.

A comparator 6 is connected to the outputs of the mean value detector 2, 3 and the peak value detector 4, 5 and functions to compare the magnitudes of the mean and peak values, indicated by DC voltage outputs of said mean and peak value detectors, respectively. A limiting diode 7 has an anode connected to a common point in the connection between the pulse generator 1 and the tuned circuit $LC_1C_2$ and a cathode connected to a non-linear stabilizing element 8. A capacitor 9 is connected in shunt across the non-linear stabilizing element 8.

A common point in the connection between the limiting diode 7 and the non-linear stabilizing element 8 is connected to a switch resistor 10. The switch resistor 10 is connected in series with a filter comprising a resistor 11 and capacitors 12 and 13 in pi connection. The filter 11, 12, 13 is supplied with a DC voltage by a pair of rectifier diodes 14 and 15 from an AC voltage source 16 which comprises a suitable winding of a main transformer.

The known circuit arrangement of FIG. 1 may measure the damping of the oscillations produced by the tuned circuit $LC_1C_2$ or the parameters of an object which may be an electrical conductor or a dielectric. The object may be galvanically coupled to the tuned circuit $LC_1C_2$. The object may be inductively coupled to the tuned circuit $LC_1C_2$ by being positioned in operative proximity with the inductor L of said tuned circuit. The object may be capacitively coupled to the tuned circuit $LC_1C_2$ by being positioned in the dielectric of the capacitor $C_1$ of said tuned circuit. When the oscillator is an electromechanical or magnetomechanical resonator, the object may be a surrounding solid, liquid or gas in electrical contact with the surface of the resonator. An object is not shown in FIG. 1 in order to enhance the clarity of illustration.

In operation, the tuned circuit $LC_1C_2$ is energized by the pulses produced by the pulse generator 1 to produce free oscillations. The pulse generator 1 may comprise any suitable pulse generator. The mean value detector 2, 3 detects the mean value $V_{st}$ of the envelope of the free oscillations and provides a DC output voltage having a magnitude proportional to such mean value. The DC output voltage of the mean value detector 2, 3 is provided at the load resistor 3 thereof. The peak value detector 4, 5 detects the peak value $V_{max}$ of the envelope of the free oscillations and provides a DC output voltage having a magnitude proportional to such peak value. The DC output voltage of the peak value detector 4, 5 is provided at the load resistor 5 thereof. The peak value is determined by adjustment of the capacitive divider $C_1C_2$. The DC voltage outputs of the mean and peak value detectors 2, 3 and 4, 5 are compared in magnitude by the comparator 6, which may comprise any suitable comparator such as, for example, a cathode follower bridge.

In the operation of the known embodiment of FIG. 1, the peak value $V_{max}$ of the free oscillations is limited by the limiting diode 7, which is blocked by the cutoff voltage $E_z$ of the non-linear stabilizing element 8. The non-linear stabilizing element 8 may comprise a glow discharge lamp or a Zener diode, for example. The cutoff voltage $E_z$ is provided by the AC voltage source 16, the rectifiers 14 and 15 and the filter 11, 12, 13. The switch resistor 10 insures sufficient stability for the non-linear stabilizing element 8. The shunt capacitor 9 of the non-linear stabilizing element 8 functions as a short circuit for high frequency components.

In FIG. 2, which illustrates an embodiment of the circuit arrangement of the present invention, the pulse generator 1, which is the same as that of FIG. 1, supplies pulses to an oscillator which comprises a tuned circuit having an inductor L and a capacitor C connected in a closed loop. The mean value detector 2, 3 which is the same as that of FIG. 1, detects the mean value of the envelope of free oscillations produced by the tuned circuit LC.

The comparator 6 of FIG. 2, which is the same as that of FIG. 1, is connected to the output of the mean value detector 2, 3 and compares the magnitudes of the mean and peak values, indicated by the DC voltage outputs of the mean value detector and a peak value detector, respectively. The limiting diode 7 has an anode connected to a common point in the connection between the pulse generator 1 and the tuned circuit LC and a cathode connected to the cathode of the non-linear stabilizing element or Zener diode 8. The anode of the Zener diode 8 is connected to ground. The capacitor 9 is connected in shunt across the non-linear stabilizing diode 8. A resistive voltage divider 17, 18 is also connected in shunt across the non-linear stabilizing diode 8. The midpoint of the resistive voltage divider 17, 18 is connected to the comparator 6 and provides to said comparator a DC voltage having a magnitude proportional to the peak value of the envelope of free oscillations.

The circuit arrangement of the present invention, as illustrated in FIGS. 2 and 3, may measure the damping of the oscillations produced by the tuned circuit LC or the parameters of an object which may be an electrical conductor or a dielectric. The object may be galvanically coupled to the tuned circuit LC. The object may be inductively coupled to the tuned circuit LC by being positioned in operative proximity with the inductor L of said tuned circuit. The object may be capacitively coupled to the tuned circuit LC by being positioned in the dielectric of the capacitor C of said tuned circuit. When the oscillator is an electromechanical or magnetomechanical resonator, the object may be a surrounding solid, liquid or gas in electrical contact with the surface of the resonator. An object is not shown in FIG. 2 in order to enhance the clarity of illustration.

In operation, the tuned circuit LC is energized by the pulses produced by the pulse generator 1 to produce free oscillations. The mean value detector 2, 3 detects the mean value $V_{st}$ of the envelope of the free oscillations and provide a DC output voltage having a magnitude proportional to such mean value. The DC output voltage of the mean value detector 2, 3 is provided at the load resistor 3 thereof. During the limiting period of the limiting diode 7, current pulses flow through said limiting diode and the DC cutoff voltage $E_z$ is generated by the Zener diode 8, which is the non-linear stabilizing element. The DC cutoff voltage $E_z$ is equal to the Zener voltage across the Zener diode 8. The reference voltage $E_{ref}$ equals the cutoff voltage $E_z$ and appears at the resistive voltage divider 17, 18. The corresponding portion of the reference voltage, proportional to the peak value of the envelope of the free oscillations, is provided by the resistive voltage divider 17, 18 as is supplied to the comparator 6, where it is compared in magnitude with the mean value proportional voltage provided by the mean value detector 2, 3.

In FIG. 3, a suitable pulse generator 1 is shown in detail. The pulse generator 1 comprises a 10 kilocycle per second crystal oscillator having a crystal K and a pentode-triode tube ECF 82. The crystal K is connected to the pentode part of the oscillator tube. The triode part of the oscillator tube produces a signal for synchronizing a multivibrator comprising a dual triode tube ECC. The multivibrator produces narrow voltage pulses for controlling the output stage which comprises a pentode EL 86. The output stage of the pulse generator 1 provides current pulses which energize the tuned circuit LC to produce free oscillations.

The tuned circuit LC is tuned to 400 kilocycles per second. The damping of the free oscillations produced by the tuned circuit LC is influenced by an object 21 of the type described with reference to FIGS. 1 and 2, positioned as described with reference to FIGS. 1 and 2. The mean value detector 2, 3 produces across its load resistor 3 a DC voltage having a magnitude proportional to the mean value of the envelope of the free oscillations.

The limiting diode 7 maintains the peak value $V_{max}$ of the free oscillations at the magnitude of the cutoff voltage $E_z$, which is provided by the Zener diode 8 via current pulses which flow through said limiting diode during the limiting period. The resistive voltage divider 17, 18 of FIG. 3 includes a variable resistor or potentiometer 19 for providing a fine adjustment of the reference voltage.

The comparator 6 of FIG. 3 comprises a cathode follower bridge which compares the magnitudes of the DC voltages proportional to the mean value and the peak value of the envelope of the free oscillations and provides the difference to an indicator instrument M. The diode 2 of the mean value detector 2, 3 comprises one part of a dual diode tube 6B32. The other part of the dual diode tube 6B32, which is the diode 2', is connected in the path of the reference voltage, with its anode connected to the slidable or variable contact of the potentiometer 19 of the resistive voltage divider and its cathode connected to the control grid of one of the parts of the dual triode tube ECC82 of the comparator 6 via a resistor. The diode 2' compensates for initial currents.

In an operating embodiment of the modification of FIG. 3, the components had the following values. In the pulse generator 1, a resistor 22 had a resistance of 100 kilohms, a resistor 23 had a resistance of 20 kilohms, a resistor 24 had a resistance of 10 kilohms, a resistor 25 had a resistance of 10 kilohms, a resistor 26 had a resistance of 100 kilohms, a resistor 27 had a resistance of 100 kilohms, a resistor 28 had a resistance of 500 kilohms, a resistor 29 had a resistance of 1 megohm, a resistor 31 had a resistance of 6 kilohms and a resistor 32 had a resistance of 100 kilohms, a capacitor 33 had a capacitance of 0.5 microfarad, a capacitor 34 had a capacitance of 2000 picofarads, a capacitor 35 had a capacitance of 20 picofarads, a capacitor 36 had a capacitance of 1000 picofarads, a capacitor 37 had a capacitance of 10 picofarads, a capacitor 38 had a capacitance of 10 picofarads, a capacitor 39 had a capacitance of 150 picofarads, a capacitor 41 had a capacitance of 150 picofarads and a capacitor 42 had a capacitance of 4 microfarads, and the crystal K has a frequency of 10 kilocycles per second.

In the resistive voltage divider, the resistor 17 had a resistance of 65 kilohms and the resistor 18 had a resistance of 15 kilohms. The capacitor 9 had a capacitance of 0.2 microfarad. In the mean value detector, the load resistor 3 had a resistance of 1 megohm. In the comparator 6, a resistor 43 had a resistance of 3 megohms, a resistor 44 had a resistance of 3 megohms, a resistor 45 had a resistance of 50 kilohms, a resistor 46 had a resistance of 50 kilohms, a resistor 47 had a resistance of 5 kilohms, a resistor 48 had a resistance of 0.1 megohm and a resistor 49 had a resistance of 0.1 megohm, and a capacitor 50 had a capacitance of 200 picofarads and a capacitor 51 had a capacitance of 200 picofarads. The meter M was rated at 200 microamperes.

The circuit of FIG. 3, having the foregoing values, functioned completely as desired with an extraordinarily long term stability in provided measurements of specific electrical resistance and electrically conductive surface thicknesses of the object 21 in a range of specific resistances of from $10^{-6}$ ohm-centimeters to $10^{-1}$ ohm centimeters and in a range of surface thicknesses of from 50 A. or 0.005 micrometer to 0.1 millimeter.

The dependence of the damping of the free oscillations upon the distance of the object 21 from the tuned circuit LC permits the utilization of the circuit arrangement of the present invention for the sensitive measurement of insulation layers on metals, for the sensitive measurement of oxidation layers on aluminum, for example, starting at micrometers.

The indicator or meter M of the comparator 6 of FIG. 3 may be replaced by or supplemented by a relay, amplifier, or the like, for transferring the resultant difference signal in an automatic measurement or control system. The resultant difference signal may be utilized to automatically adjust the potentiometer 19 of the resistive voltage divider 17, 18 to control the reference value. The control system may thus comprise a servosystem; the slidable contact of the potentiometer 19 being moved by a servomotor. The servosystem would function to maintain the resultant difference signal substantially at zero. The actual position of the slidable contact of the potentiometer 19 would then indicate the actual indication or measurement.

While the invention has been described by means of specific examples and in specific embodiments, we do not wish to be limited thereto, for obvious modifications will occur to those skilled in the art without departing from the spirit and scope of the invention.

We claim:
1. A circuit arrangement for measuring the damping of an oscillation, comprising:
   a source of free oscillations;
   a limiting diode connected to said source of free oscillations for limiting the peak of said free oscillations to a determined magnitude;
   a non-linear stabilizing element connected to said limiting diode for providing a cutoff voltage having a magnitude equal to said determined magnitude for blocking said limiting diode to limit the peak of said free oscillations to said determined magnitude;
   mean value detecting means connected to said source of free oscillations for providing a voltage proportional to the mean value of the envelope of the free oscillations;
   peak value means connected to said non-linear stabilizing element for providing a voltage proportional to the peak value of said free oscillations; and
   comparing means connected to said mean and peak value means for comparing the magnitudes of the voltages provided by said mean and peak value means.

2. A circuit arrangement as claimed in claim 1, wherein said peak value means comprises a resistive voltage divider connected across said non-linear stabilizing element.

3. A circuit arrangement as claimed in claim 1, wherein said non-linear stabilizing element comprises a Zener diode.

4. A circuit arrangement as claimed in claim 1, wherein said non-linear stabilizing element is connected in series with said limiting diode and wherein said peak value means comprises a resistive voltage divider having one end connected to one end of said non-linear stabilizing element and another end connected to the other end of said non-linear stabilizing element at a common point in the connection between said non-linear stabilizing element and said limiting diode.

5. A circuit arrangement as claimed in claim 1, wherein said source of free oscillations comprises a tuned circuit and a source of pulses connected to said tuned circuit for energizing said tuned circuit, and wherein said determined magnitude is smaller than said peak value.

6. A circuit arrangement as claimed in claim 4, wherein said non-linear stabilizing element comprises a Zener diode.

7. A circuit arrangement as claimed in claim 4, further comprising a capacitor connected across said non-linear stabilizing element.

8. A circuit arrangement as claimed in claim 4, wherein said resistive voltage divider comprises a potentiometer having a slidable contact, said comparing means being connected to said slidable contact.

9. A circuit arrangement as claimed in claim 8, further comprising a diode connected in the connection between said comparing means and the slidable contact of the potentiometer of said resistive voltage divider for compensating for initial currents, and wherein said mean value detecting means comprises a diode and a resistor connected in series with each other between said source of free oscillations and said comparing means.

10. A circuit arrangement as claimed in claim 9, wherein each of said diodes is a vacuum tube diode.

References Cited

UNITED STATES PATENTS

| | | | |
|---|---|---|---|
| 3,103,655 | 9/1963 | Jones | 328—5 XR |
| 3,381,217 | 4/1968 | Williamson et al. | 324—41 |
| 3,458,731 | 7/1969 | Michon et al. | 328—223 XR |

STANLEY T. KRAWCZEWICZ, Primary Examiner

U.S. Cl. X.R.

324—34, 41